United States Patent [19]
Johnson

[11] Patent Number: 5,872,602
[45] Date of Patent: Feb. 16, 1999

[54] FLUOROSCOPIC IMAGING SYSTEM WITH IMAGE ENHANCEMENT APPARATUS AND METHOD

[76] Inventor: Robert E. Johnson, 1342D Benson Ave., Upland, Calif. 91786

[21] Appl. No.: 638,325

[22] Filed: Apr. 26, 1996

Related U.S. Application Data

[60] Provisional application No. 60/008,564, Dec. 13, 1995.

[51] Int. Cl.⁶ .................................................... H04N 5/14
[52] U.S. Cl. ......................... 348/620; 348/627; 348/701; 348/687; 382/265; 382/274
[58] Field of Search .................................... 348/619, 620, 348/607, 625, 627, 631, 669, 673, 687, 701, 295, 699; 382/107, 237, 265, 274; 364/724.17; 378/98.2, 98.7, 98.12; H04N 5/14

[56] References Cited

U.S. PATENT DOCUMENTS

| | | | |
|---|---|---|---|
| Re. 25,118 | 1/1962 | Graves | 250/93 |
| 3,632,865 | 1/1972 | Haskell et al. | 178/6 |
| 4,101,961 | 7/1978 | Reiber | 378/98.7 |
| 4,590,582 | 5/1986 | Umemura | 364/724 |
| 4,651,206 | 3/1987 | Ohki | 358/136 |
| 4,652,907 | 3/1987 | Fling | 348/620 |
| 4,677,478 | 6/1987 | Kruger et al. | 378/98.12 |
| 4,737,850 | 4/1988 | Lu et al. | 358/167 |
| 4,847,909 | 7/1989 | Shibata | 382/107 |
| 4,930,144 | 5/1990 | Plut et al. | 378/99 |
| 5,003,572 | 3/1991 | Meccariello et al. | 378/98.7 |
| 5,003,618 | 3/1991 | Meno | 382/54 |
| 5,025,316 | 6/1991 | Darby | 358/167 |
| 5,091,925 | 2/1992 | Haendle et al. | 378/99 |
| 5,119,195 | 6/1992 | Christopher | 358/167 |
| 5,164,583 | 11/1992 | Aichinger et al. | 250/214 VT |
| 5,187,730 | 2/1993 | Fujihara | 378/97 |
| 5,191,419 | 3/1993 | Wischermann | 348/620 |
| 5,271,055 | 12/1993 | Hsieh et al. | 378/95 |
| 5,347,590 | 9/1994 | Nonnweiller et al. | 382/6 |
| 5,384,865 | 1/1995 | Loveridge | 382/54 |
| 5,434,902 | 7/1995 | Bruijns | 378/98.7 |
| 5,436,952 | 7/1995 | Haendle et al. | 378/98.7 |
| 5,438,374 | 8/1995 | Yan | 348/620 |
| 5,617,462 | 4/1997 | Spratt | 378/98.7 |

*Primary Examiner*—Sherrie Hsia
*Attorney, Agent, or Firm*—Robert Platt Bell & Associates, P.C.

[57] ABSTRACT

The present invention comprises an apparatus and method for automatically controlling the degree of temporal integration in a real time video image processor. The degree of integration may be determined by a combination of image brightness detected over a specific area of an image and motion detected within specific locations within the image. The apparatus comprises two main components, an integrating processor and integrating controller. The integrating processor receives an incoming analog video signal and converts it in an A/D converter into a series of digital pixel values. These digital pixel values may then be passed through an arithmetic processing unit where each pixel value may be fractionalized and summed with a fractionalized value of a geometrically corresponding pixel or pixels stored in a memory (i.e., temporal or recursive filtration). The sum of these fractionalized pixel values may then in turn be stored in memory as a new pixel values. The new image comprised of these pixel values stored in the memory may then be sent to digital to analog converter and then output to a monitor or video recorder. The amount of recursive filtration may be controlled using a fuzzy logic algorithm using brightness and motion as input vectors.

39 Claims, 13 Drawing Sheets

INTEGRATING PROCESSOR BLOCK DIAGRAM

FLUOROSCOPIC IMAGING SYSTEM WITH IMAGE ENHANCEMENT APPARATUS AND METHOD

CROSS-REFERENCE TO RELATED APPLICATIONS

This application claims priority from Provisional U.S. application Ser. No. 60/008,564, filed Dec. 13, 1995 and incorporated herein by reference.

FIELD OF THE INVENTION

The present invention relates to an apparatus and method for enhancing video images, particularly as applied to real-time X-ray fluoroscopic imaging systems.

BACKGROUND OF THE INVENTION

FIGS. 1 and 2 illustrate an example of a prior art real-time X-ray fluoroscopic imaging system. Such systems may be used in the medical field to view interior portions of a patient's body without the need for invasive surgery. The fluoroscopic imaging system of FIG. 1 comprises an X-ray generator 101 and X-ray tube 102 which generate a radiation beam 103 which may be collimated and directed at an input surface of X-ray image intensifier 104. Patient 105 may be placed in the path of radiation beam 103, modulating radiation beam 103 before it strikes X-ray image intensifier 104 and thus generating a real-time image.

Image intensifier 104 converts modulated radiation beam 103 to a visible image which may be optically coupled to closed circuit television (CCTV) camera 106 and/or film camera 107 through optical distributor 108. X-ray Image intensifier 104 is an electro-optical device which converts X-ray radiation into a visible image. Intensification of the image may be accomplished by both a geometric reduction in image size and amplification via electron optics.

CCTV camera 106 converts the visible image into an electronic signal which may be transferred to a television monitor 201 and/or video recorder 202 for observation and/or recording, respectively. In addition, the video signal from CCTV camera 106 may be modified or enhanced by real time video image processor 203 which may be located at any point between CCTV camera 106 and television monitor 201 and/or video recorder 202. Film camera 107 may be used to record either multiple images (e.g., cine camera) or single image (e.g., still camera). Magnetic disk Storage 205 may be used to store data representing a frame or frames of video image for later retrieval and display.

During observation or recording of real-time images using CCTV camera 106, the radiation exposure level is relatively low, and due to the quantum nature and statistical uncertainty in energy levels of the X-ray photons, the signal-to-noise ratio of X-ray beam 103 may be relatively poor in comparison to a film image created by employing much greater quantities of radiation. This poor signal-to-noise ratio impairs the diagnostic quality of the resulting television image. The largest component of this "quantum noise" is temporal in nature, i.e., it varies more in time than in space.

Traditional methods for improving this temporal noise has been to use a television camera pick-up tube (e.g., vidicon tube) with a suitable amount of integration (time lag) which effectively reduces the amount of quantum noise to an acceptable level. Over the years of development of television camera systems used in fluoroscopy, this integrating characteristic of camera pick-up tubes has reached a high level of refinement resulting in a diagnostically acceptable video signal-to-noise ratio at relatively low radiation exposure levels.

Television cameras which use solid state sensors (e.g., charge coupled device (CCD) or the like) are now being used in fluoroscopy. Such solid state devices, however, have relatively no integration relative to a tube type pick-up sensor. As a consequence, some form of electronic image processing may be desirable to integrate video signals to improve the signal-to-noise ratio. Since the primary noise component is temporal, and the signal is video, the image processor must integrate in the time domain and at the video frame rate of the television system. Such image processing may be typically accomplished by employing a digital recursive filter.

Different types of fluoroscopic procedures and changing conditions during an individual procedure, however, require different amounts of temporal integration in order to obtain the highest degree of diagnostic image quality. Temporal integration improves the signal-to-noise ratio of an image, but may degrade temporal response, causing a "smearing" of moving objects. Consequently, more integration may be employed when there is little motion within an image. Prior art recursive filters may be provided with a motion detector and/or a manual selector to vary the amount of integration. Such techniques, however, do not accurately mimic the action of a pickup tube sensor.

A pick-up tube sensor's degree of integration varies primarily with the brightness of an image. This phenomenon may be observed, for example, in films of black and white television programs filmed using vidicon tubes. Bright images such as reflections or the like tend to integrate more and thus may be observed as a smearing effect or afterimage. In fluoroscopy, this integrating effect is one that physicians and technicians have become accustomed to in the over thirty years of use of the tube type sensors in X-ray fluoroscopy. The integrating effect of the tube type sensor is automatic, requiring no input from the observing physician or technicians.

FIGS. 3 and 4 illustrate the operation of recursive filtration (i.e., time based integration) versus spatial integration. Recursive filtration is a form of image processing in which every new image may be summed with a fractional combination of previous images to form an actual observable image. Recursive filtration is a temporal (i.e., time based), in other words, each pixel in the most recent image frame may be summed with a fractional combination of every geometrically corresponding pixel of all previously occurring image frames to form the presently observable image frame. Thus, each pixel in a recursive filter may be an integral of all preceding geometrically corresponding pixels. This type of filter may be distinct from a spatial filter in which each pixel in the most recent image frame may be integrated with a number of surrounding pixels in the same image frame to form a presently observable image frame.

A spatial filter integrates over space, while a recursive filter integrates over time. A variable recursive filter changes the fractional weighting of previous image frames and the present image frame in order to change the degree of integration present in the presently observable image frame. In order to achieve a longer time integral, greater weight may be given to previous image frame pixel values. Conversely, in order to achieve a shorter time integral, more weight may be given to the present image frame pixel values.

OBJECTS OF THE INVENTION

It is an object of the present invention to compensate for the non-integrating characteristics of a CCD camera pickup in a fluoroscopic imaging system.

It is a further object of the present invention to control an amount of recursive filtration in a fluoroscopic imaging system in response to both brightness and motion detection inputs.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

DETAILED DESCRIPTION OF THE INVENTION

Figure 1:
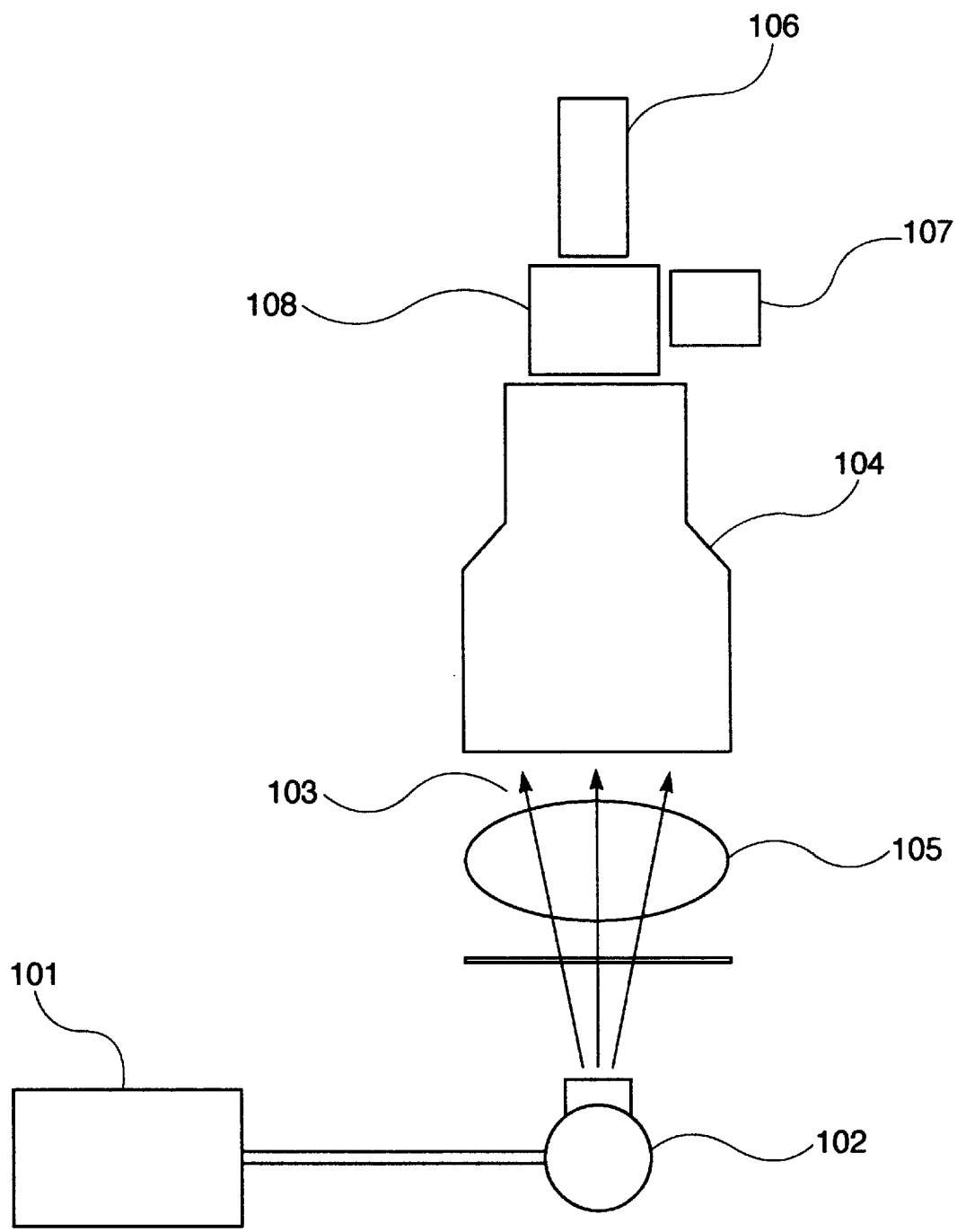
FIG. 1 is a diagram illustrating the major components in a prior art X-ray fluoroscopy system.
Figure 2:
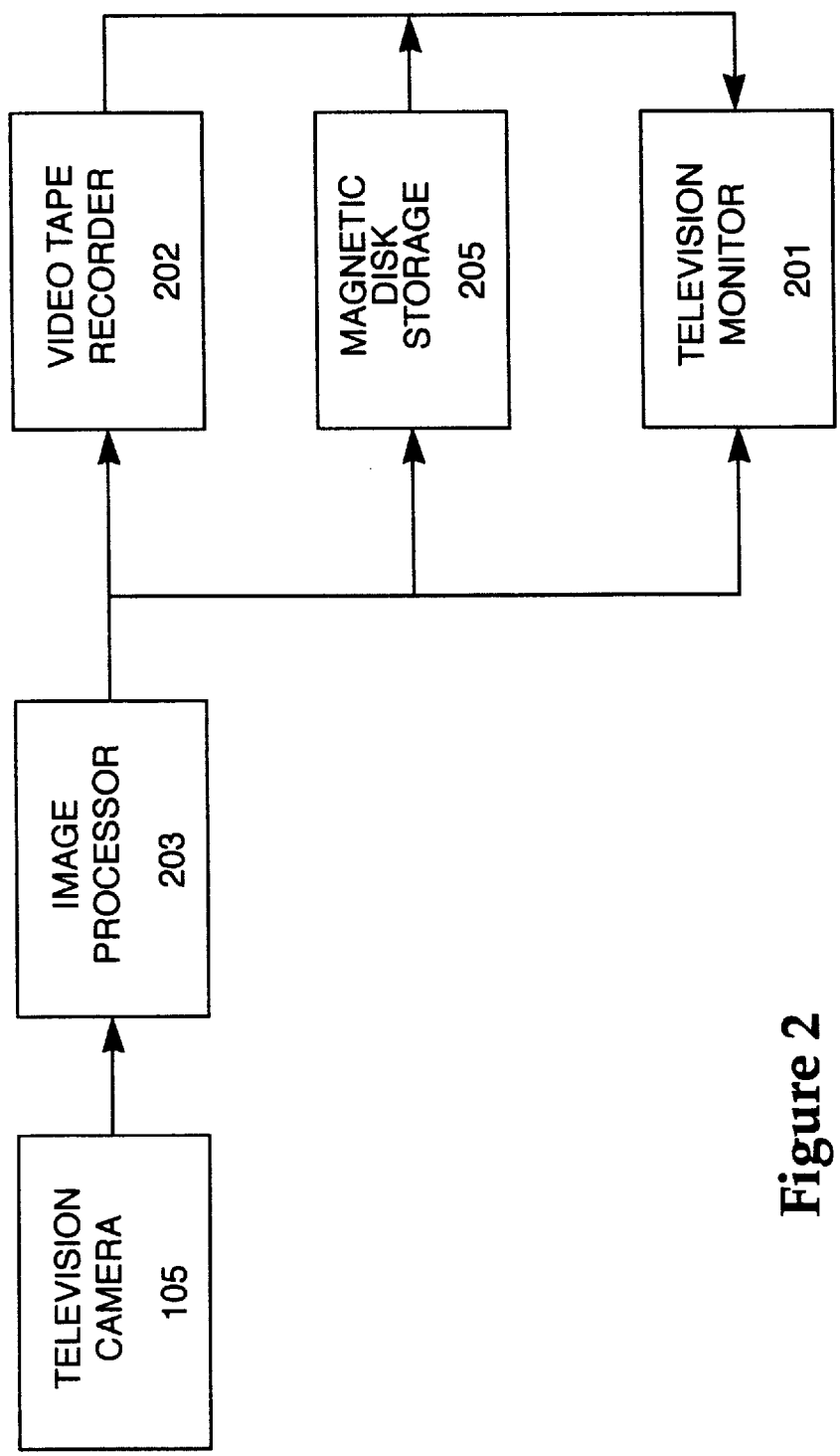
FIG. 2 is a block diagram illustrating the major electrical components of the system of FIG. 1.
Figure 3:
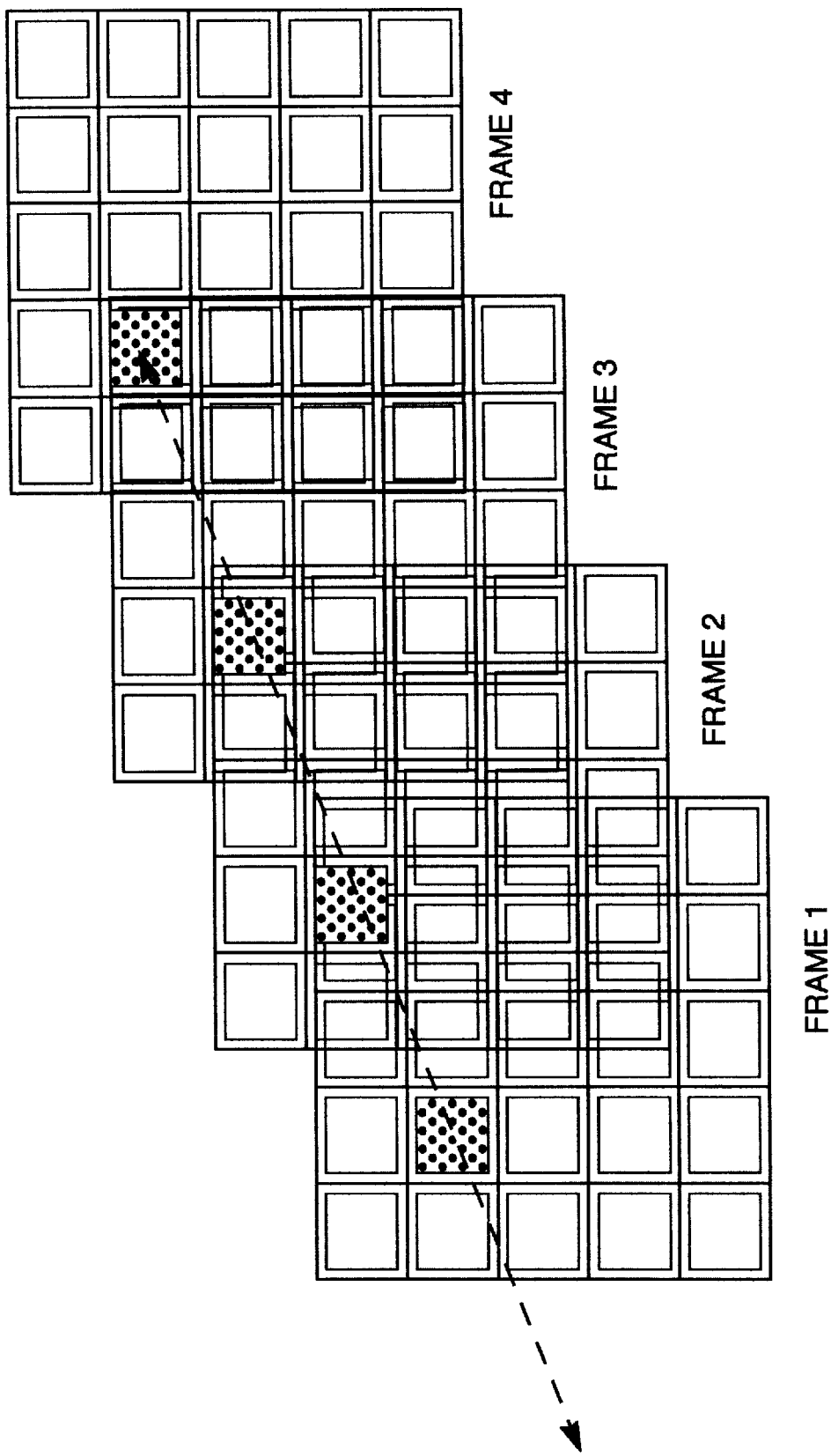
FIG. 3 is a diagram illustrating the effect of temporal (time based) filtering.
Figure 4:
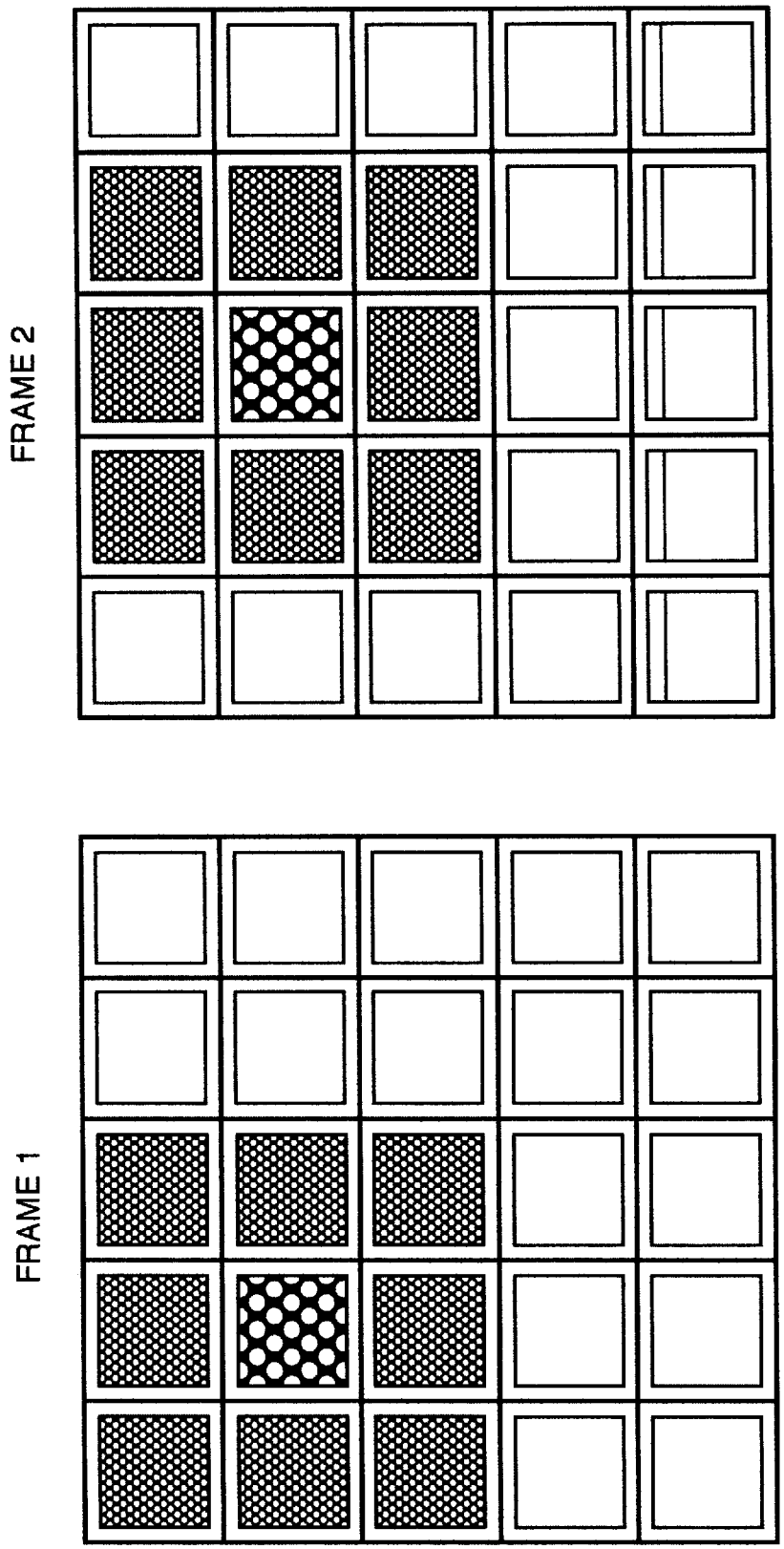
FIG. 4 is a diagram illustrating the effect of spatial filtering.
Figure 5:
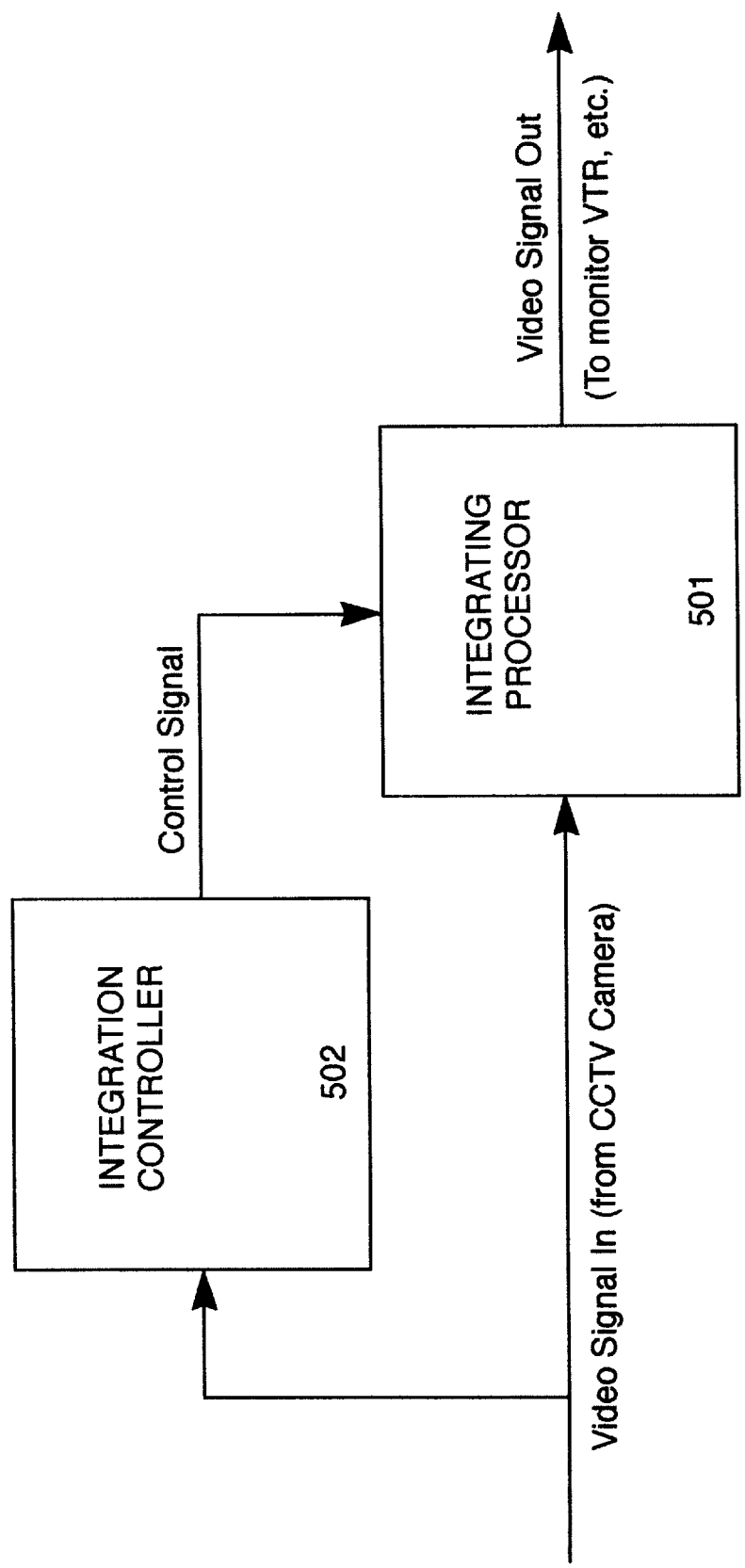
FIG. 5 is a simplified block diagram of a portion of the present invention.

FIG. 5 is a simplified block diagram of a portion of the apparatus of the present invention. The present invention comprises an apparatus and method for automatically controlling the degree of temporal integration in a real time video image processor. The degree of integration may be determined by a combination of image brightness detected over a specific area of an image and motion detected within specific locations within the image.

Figure 6:
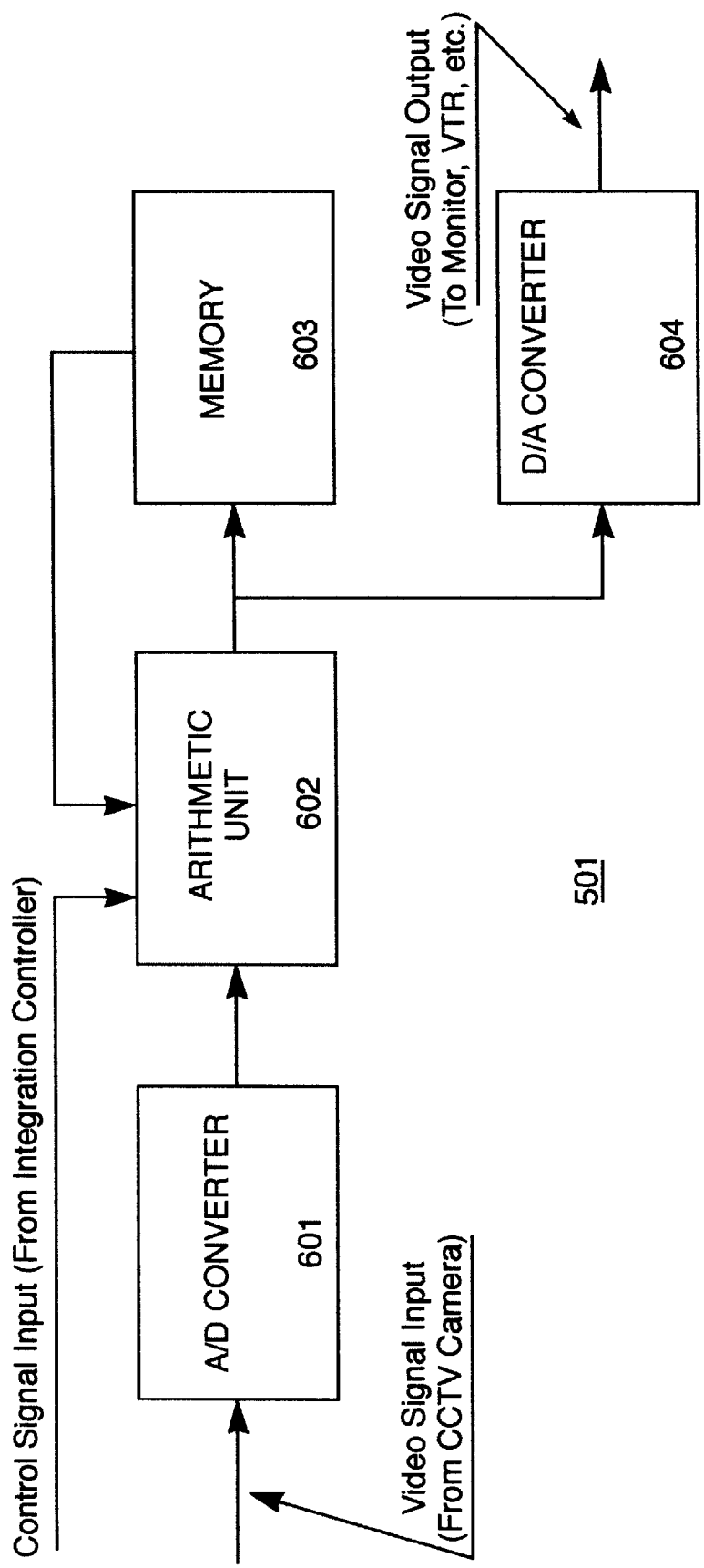
FIG. 6 is a block diagram illustrating the major components of integrating processor 501 of FIG. 5.

The apparatus of the present invention, as illustrated in FIG. 5, comprises two main components, integrating processor 501 and integrating controller 502. FIG. 6 is a block diagram illustrating the major components of integrating processor 501 of FIG. 5. Integrating processor 501 receives an incoming analog video signal and converts it in A/D converter 601 into a series of digital pixel values. These digital pixel values may then be passed through arithmetic processing unit 602 where each pixel value may be fractionalized and summed with a fractionalized value of a geometrically corresponding pixel or pixels stored in memory 603.

The sum of these fractionalized pixel values may then in turn be stored in memory 603 as a new pixel values. The new image comprised of these pixel values stored in memory 603 may then be sent to digital to analog converter 604 and then output to a monitor or video recorder as illustrated in FIG. 6.

Figure 7:
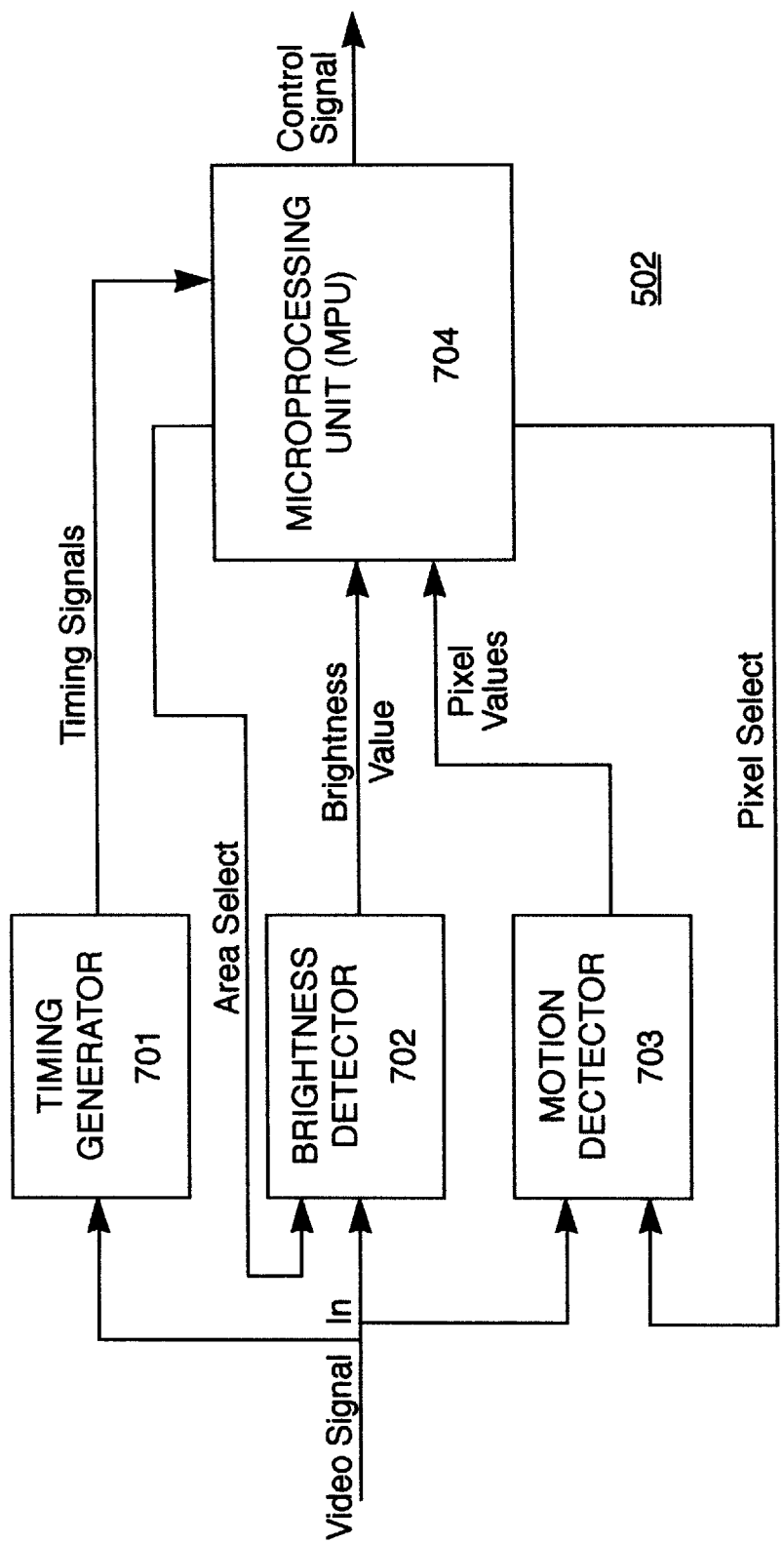
FIG. 7 is a block diagram illustrating the major components of integrating controller 502 of FIG. 5.

FIG. 7 is a block diagram illustrating the major components of integrating controller 502 of FIG. 5. Integrating controller 502 comprises timing generator 701, brightness detector 702, motion detector 703, and microprocessing unit 704. Timing generator 701 extracts synchronization information from the video signal for use by microprocessing unit 704 in determining a brightness detection area and location of pixels used for motion detection.

Brightness detector 702 provides a relative brightness value to microprocessing unit 704. Motion detector 703 provides a series of pixel values to microprocessing unit 704 derived from pixels distributed throughout an image frame. The pixel values supplied by motion detector 703 may be used by microprocessing unit 704 to determine the degree of motion present in the incoming video signal. Microprocessing unit 704 may provide a signal to both brightness detector 702 and motion detector 703 to establish an area for brightness detector 702 and a pixel location for motion detector 703 used in the formation of their respective signals.

Microprocessing unit 704 may vary the area and pixel location based upon previous brightness and motion values, respectively, to produce an integration control signal. The integration control signal, when received by integration processor 501, determines the amount of fractional weighting of present and stored pixel values being processed by arithmetic processing unit 602.

Figure 8:
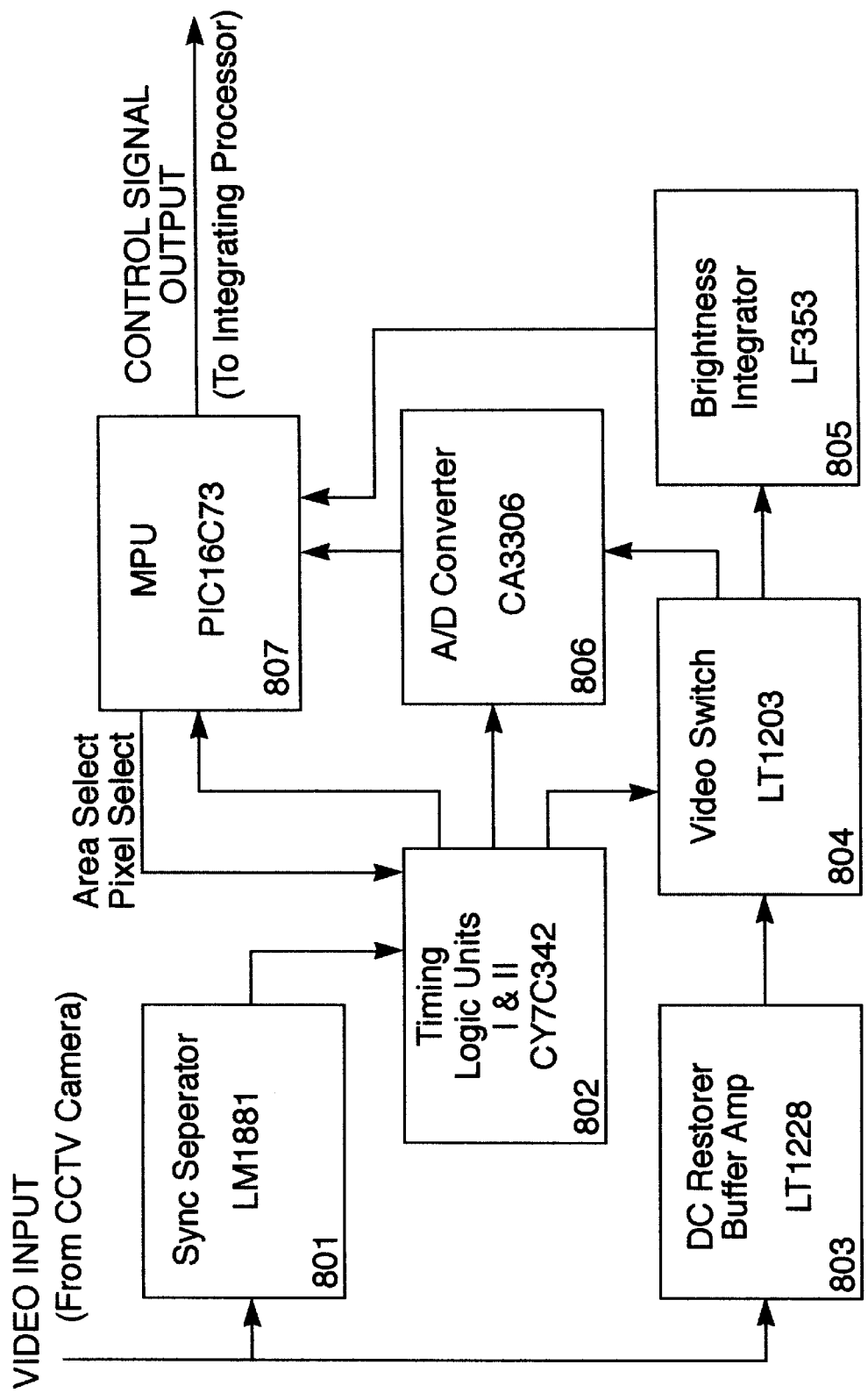
FIG. 8 is a block diagram illustrating in more detail the preferred embodiment of the integrating controller of FIG. 7.

FIG. 8 is a block diagram illustrating in more detail the preferred embodiment of the integrating controller of FIG. 7. Timing generator 701 of FIG. 7 may comprise sync separator 801 and timing logic unit I of timing logic units I & II 802. Sync separator 801 may comprise a National Semiconductor LM1881 and associated circuitry in the preferred embodiment of the present invention. Timing logic units I & II 802 may comprise a pair of Cypress Semiconductor CPLD model CY7C342B and associated circuitry.

Sync separator 801 may strip video information from the input composite video signal and produce a series of horizontal and vertical timing pulses. These horizontal and vertical timing pulses may be used by timing logic unit I of timing logic units I & II 802. Timing logic unit I of timing logic units I & II may produce a "switch on" signal as an output to video switch 804. The timing and duration of the "switch on" signal may be a function of the "area select" signal which is input to timing logic unit I of timing logic units I & II from MPU 807.

Brightness detector 702 of FIG. 7 may comprise DC restorer and buffer amp 803, video switch 804, brightness integrator 805, and at least a portion of the functionality of MPU 807. In the preferred embodiment, DC restorer and buffer amp 803 may comprise a Linear technologies LT1228 and associated circuitry. Video switch 804 may comprise a Linear Technologies LT1203 and associated circuitry. Brightness integrator 805 may comprise a National Semiconductor LF353 and associated circuitry. MPU 807 may comprise a microchip technology PIC16C73 and associated circuitry.

DC restorer and buffer amp 803 may clamp video information to a constant level. The buffer amp portion of DC restorer and buffer amp 803 may isolate CCTV camera 106 from integrating controller 502. Video switch 804, under control of timing logic unit I of timing logic units I & II 802, acts as a gate to allow a certain portion of the video information through to brightness integrator 805, and in effect determining the area of the image over which brightness integration occurs.

Brightness integrator 805 produces an analog signal, the magnitude of which is relative to the brightness of a selected area of the video image. The analog signal from brightness integrator 805 may be then output to MPU 807. An analog-to-digital converter within MPU 807 may convert the analog signal from brightness integrator 805 to a digital value. The digital value may then be used by software programmed into MPU 807 to determine the brightness level of an image for calculation of the control signal output to integrating processor 501.

Motion detector 703 of FIG. 7 may comprise timing logic unit II of timing logic units I & II 802, A/D converter 806, and at least a portion of MPU 807. A/D converter 806 may comprise a Harris Semiconductor CA3306 and associated circuitry. Using the "pixel select" data output from MPU 807, timing logic unit II of timing logic units I & II may produce an "enable" signal as output to A/D converter 806.

A/D converter 806 may produce a digital equivalent of the selected pixel value as an output to MPU 807. To establish the degree of motion within an image, MPU 807 compares each selected pixel value with its previous value (from the preceding corresponding video frame). A substantial difference in pixel values indicates the presence of motion.

Referring back to FIG. 7, MPU 704 may comprise a Microchip Technologies PIC16C73 and associated circuitry. MPU 704 uses the brightness value from brightness detector 702 and the motion value from motion detector 703 to produce a control signal output to the integrating processor, thus controlling the amount of recursive filtration. MPU 704 may also produce an "area select" output signal and a "pixel select" output signal to timing generator 701 and motion detector 703, respectively.

The "area select" signal establishes the size and shape of the active area within the image which is used to determine the brightness value. The "pixel select" signal establishes which pixels are sampled within the active area for use in the determination of the presence of motion. It is possible for MPU 704 to alter both the "area select" and "pixel select" signals on a frame-by-frame basis.

Figure 12:
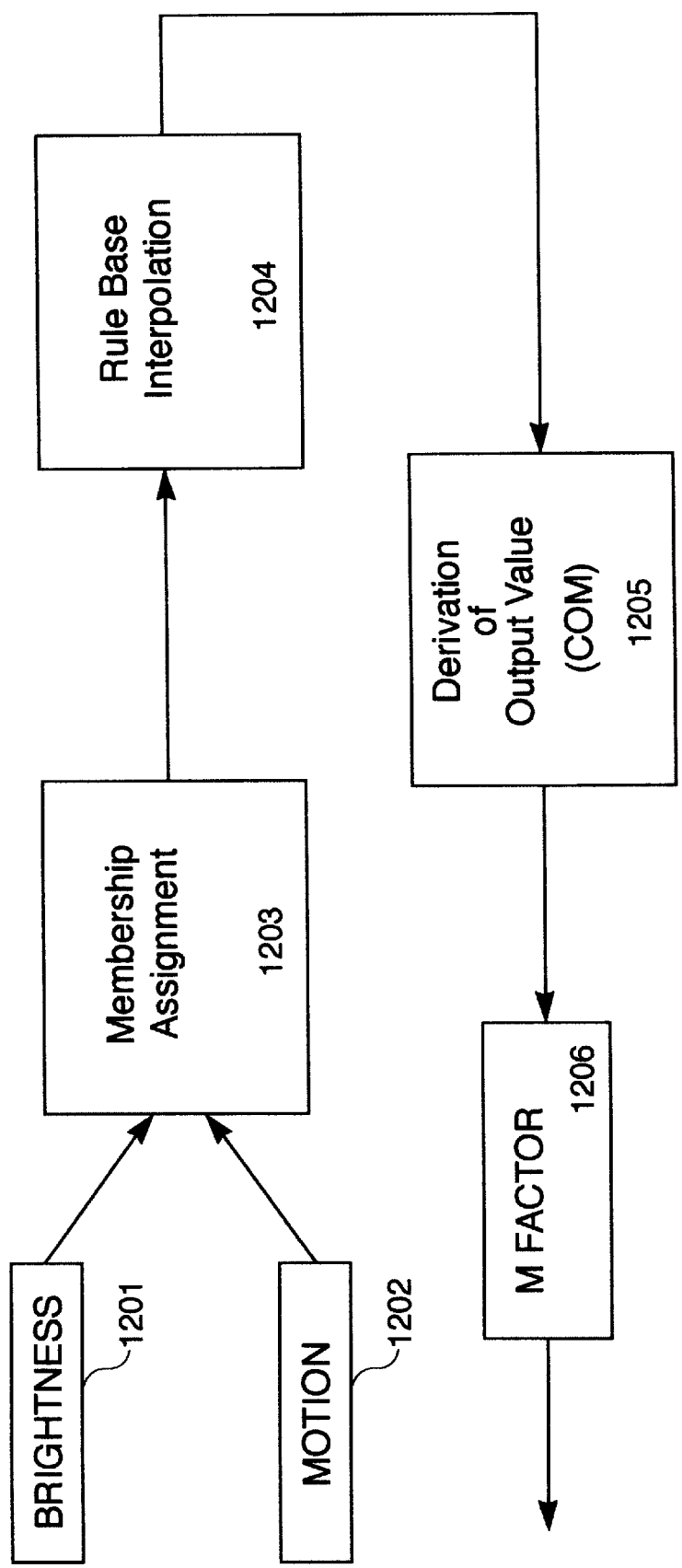
FIG. 12 is a flowchart illustrating the operation of the control software within microprocessing unit 704.

The operation of microprocessing unit 704 may be determined by control software loaded into microprocessing unit 704. FIG. 12 is a flowchart illustrating the operation of the control software within microprocessing unit 704. The control software may be provided with two inputs, a brightness value 1201 generated by brightness detector 702 and a numerical value 1202 from motion detector 703 representing motion. The software may be provided with control signal output 1206 which may be referred to as the M factor.

The M factor is a number representing the amount of recursive filtration to be performed by the integrating processor 501 of FIG. 5. The amount of recursive filtration may be expressed in a number representing the effective average number of frames of video information present in the output of integrating processor 501. In the preferred embodiment, the number of frames may vary from 1 to 3. Note that it is not necessary or even desirable to utilize a whole number of average frames. In the preferred embodiment, there may be 64 steps of effective averaging between a minimum of 1 frame and a maximum of 3 frames. Control software for MPU 704 may be based upon a fuzzy logic system, in which verbal descriptors (e.g., "very bright") may be equated to specific numerical values and a rule-based system may be used for interpolation of results. In the preferred embodiment, the input may comprise brightness 1201 and motion 1202 as discussed above, and the output may comprise M factor 1206.

Fuzzy logic describes the input and output values in terms of set membership, which is represented by the letter $\mu$. In step 1203 of FIG. 12, brightness input 1201 and motion value 1202 may be assigned set membership values $\mu$. $\mu$ may be any fractional value between zero (not a member of the set in question) and one (a full member of the set in question). This membership function may be more readily described graphically in connection with FIGS. 9, 10, and 11.

Figure 9:
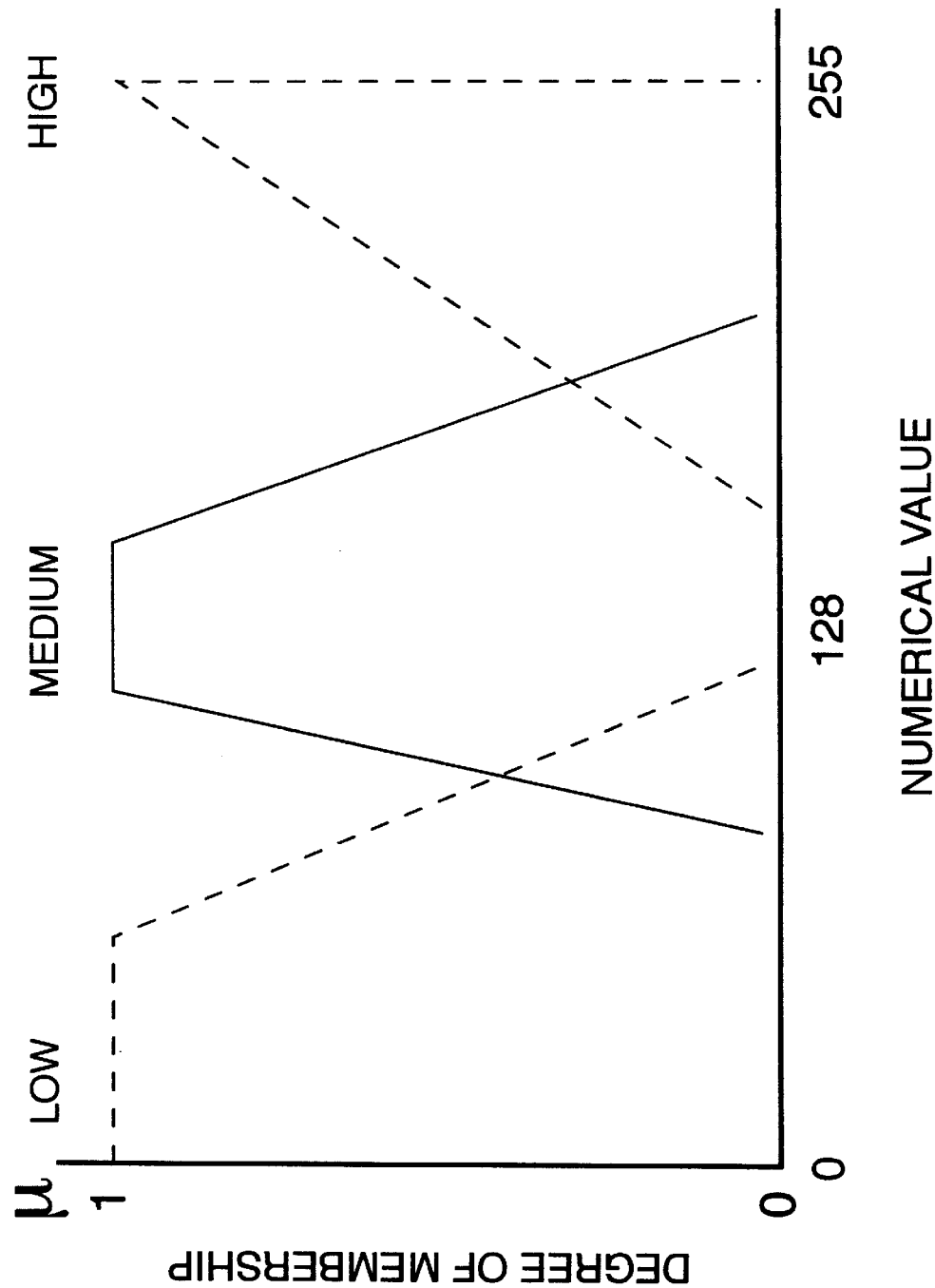
FIG. 9 is a graphical representation of the membership function for brightness.

FIG. 9 is a graphical representation of the membership function for brightness. Brightness may be described by integer values ranging from 0 to 255 and may characterized as "low", "medium", or "high".

Figure 10:
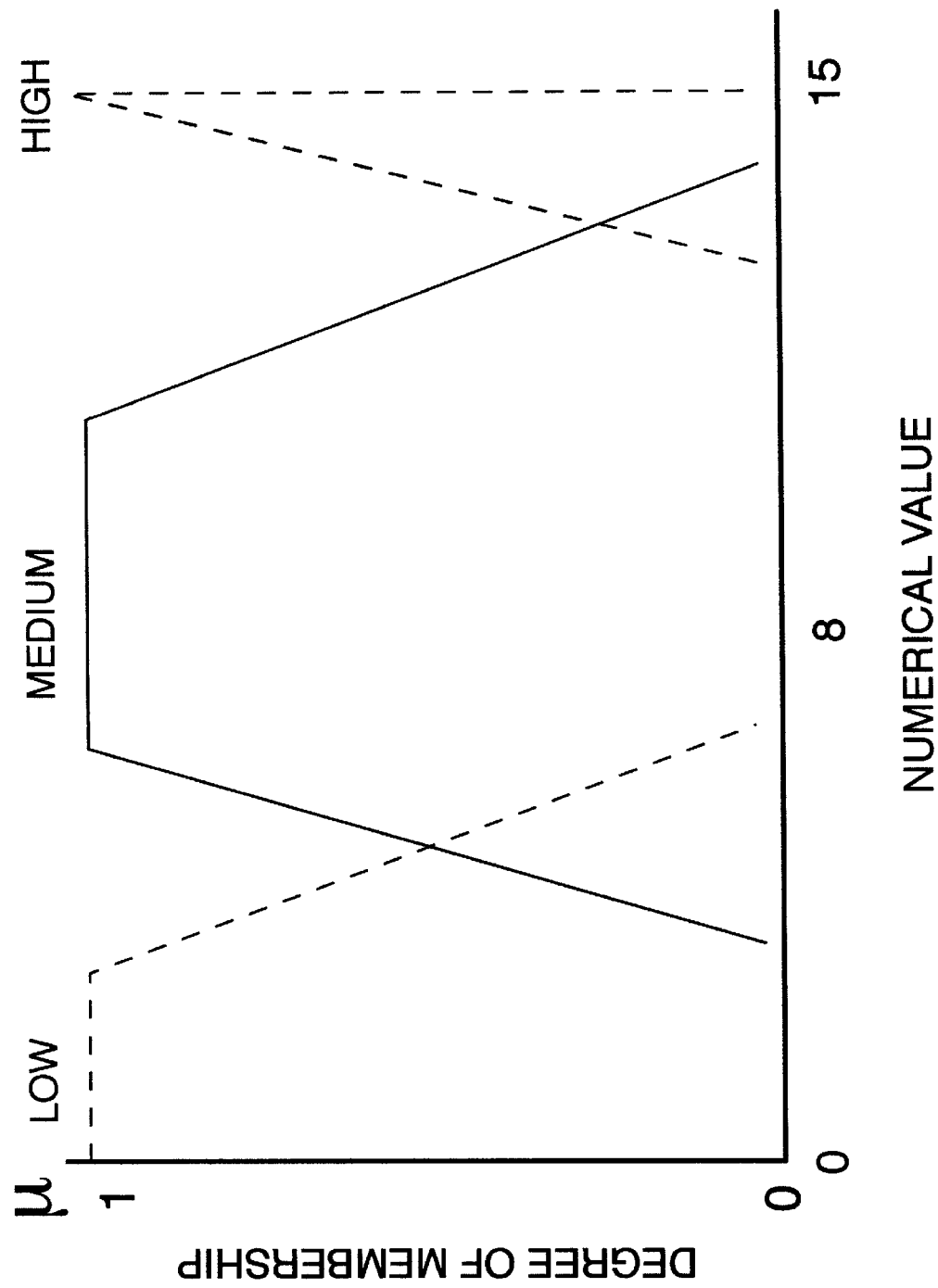
FIG. 10 is a graphical representation of the membership function for motion.

FIG. 10 is a graphical representation of the membership function for motion. Motion may be described by integer values ranging from 0 to 15 and may be described as "low", "medium" or "high".

Figure 11:
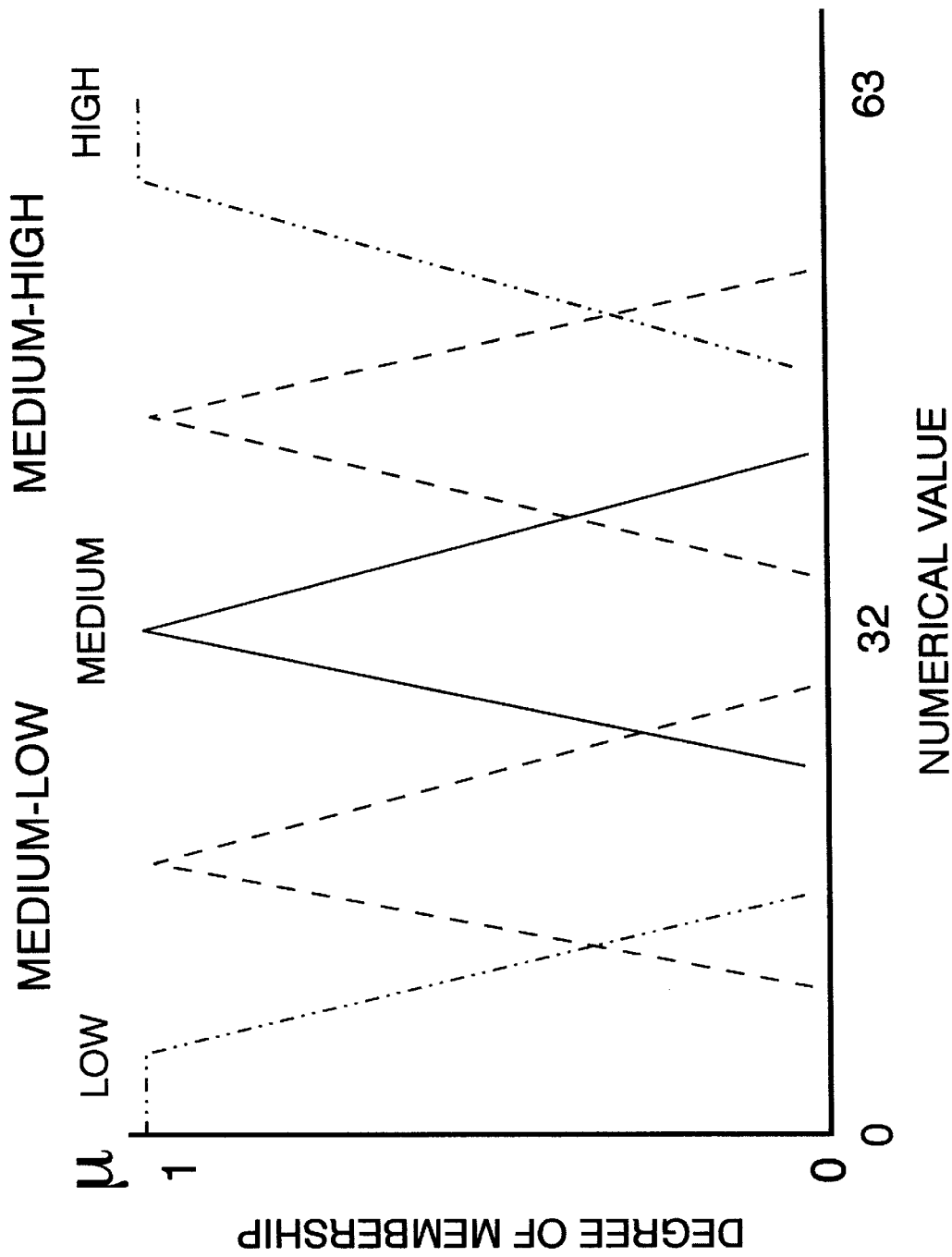
FIG. 11 is a graphical representation of the membership function for M factor.

FIG. 11 is a graphical representation of the membership function for M factor. The M factor may be described by integer values ranging from 0 to 63 and may be described as "low", "medium-low", "medium", "medium-high", or "high".

Once membership functions for the input and output values are described in step 1203, rules may be formulated in step 1204 to enable software to produce a range of possible output values from input values based upon degree of membership of the output values in the set of output descriptors. Once such ranges have been established, a discrete output value may be derived in step 1205 using, in the preferred embodiment, a method known as a "center of maximum" evaluation.

Table I Illustrates the operation of the rule base interpolation 1204 of FIG. 12. The rule base of Table I may be best described in terms of "if-then" constructs which may describe an output consequence which has a membership function of 1 only if the rule is true. Since inputs may frequently be such that the rules are only "partially" true (i.e., their membership function is less than one in any of the described rules) the software may use the rule base of Table I and the membership functions of FIGS. 9 through 11 to infer a range of outputs from given inputs.

TABLE I

| | IF | | THEN |
|---|---|---|---|
| RULE | BRIGHTNESS | MOTION | M FACTOR |
| 1 | HIGH | LOW | LOW |
| 2 | MEDIUM | LOW | MEDIUM |
| 3 | LOW | LOW | HIGH |
| 4 | HIGH | MEDIUM | LOW |
| 5 | MEDIUM | MEDIUM | MEDIUM LOW |
| 6 | LOW | MEDIUM | MEDIUM HIGH |
| 7 | HIGH | HIGH | LOW |
| 8 | MEDIUM | HIGH | MEDIUM LOW |
| 9 | LOW | HIGH | MEDIUM HIGH |

The range of outputs for M value from Table I may be used to derive a specific output M factor value 1206 in step 1205 using equation 1. The software uses a "center-ofmaximum" method to evaluate the range of possible output values and produce a single discrete output.

$$M \text{ factor} = \frac{\Sigma_i[\mu_{Ti} \cdot \max_x(\mu_{Ri}) \cdot arg(\max_x(\mu_{Ri}))]}{\Sigma_i \mu_{Ti}} \quad (EQ\ 1)$$

Where:

R=a verbal descriptor to be converted to a discrete output value $\mu_{Ri}$=membership functions of all verbal descriptors i defined for the base variable range $\mu_{Ti}$=inference result for every term i The output value M factor 1206 from step 1205 may then be used to control the amount of recursive filtration used in processing the fluoroscopic image.

Figure 13:
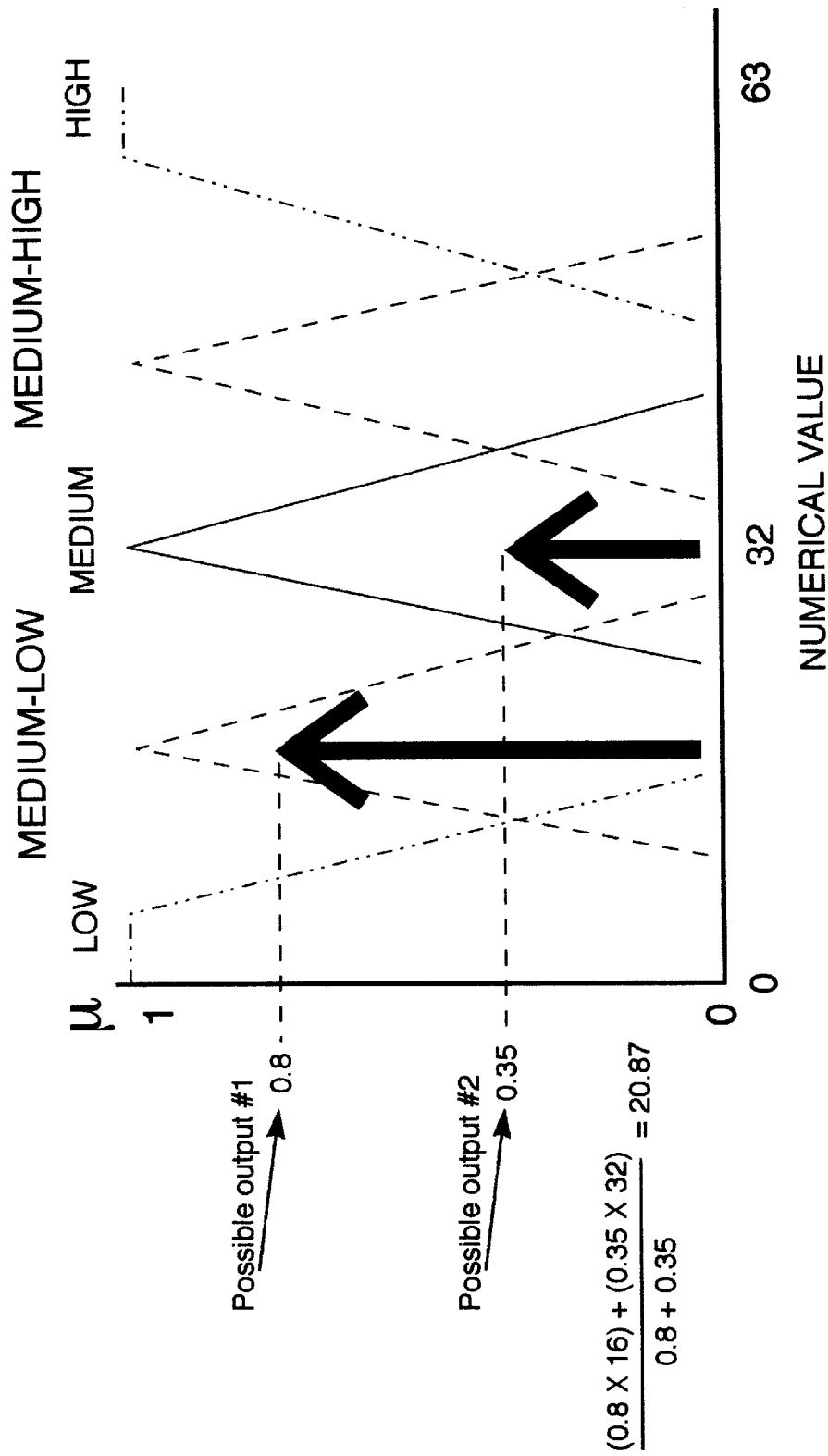
FIG. 13 illustrates an example of an output calculation made according to the control software of the present invention.

An example of such a center of maximum calculation is illustrated in FIG. 13. The output calculation (center of maximum) considers more than one possible output as valid, and produces a compromise between all possible outputs. Such a compromise may be achieved by calculating a weighted mean of the two output membership maxima. In the example of FIG. 13, two possible output have been generated by the rule base (output #1 and output #2). The maximum degree of membership of output #1 is in the set "medium-low", The maximum degree of membership of output #2 is in the set "medium". The center of maximum equation (Eq. 1) may then calculate a single, best-compromise output based upon the weighted mean of these two possible outputs. In the example of FIG. 13, the output would be:

$$M \text{ Factor} = \frac{(0.8 \times 16) + (0.35 \times 32)}{0.8 + 0.35} = 20.87$$

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. An apparatus for automatically controlling temporal integration in a real time video image processor, comprising:
   an integrating processor for receiving an input video signal, recursively filtering the input video signal, and outputting a filtered video signal; and
   an integration controller, coupled to said integrating processor and receiving the input video signal, for detecting brightness and motion in the input video signal and for controlling an amount of recursive filtration performed by said integrating processor based upon an amount of brightness and motion detected in the input video signal, said integration controller including:
   a brightness detector for receiving the input video signal, detecting a relative brightness value from the received input video signal, and outputting a relative brightness value;
   a motion detector for comparing pixel values of an input signal with pixel values of a previously input video signal and determining a degree of motion present in the input video signal; and
   processing means, coupled to the brightness detector and the motion detector, for receiving the relative brightness value and the decree of motion, respectively, and outputting a control signal to said integrating processor for controlling the amount of recursive filtration performed by said integrating processor based upon the amount of brightness and motion detected in the input video signal.

2. The apparatus of claim 1, wherein said input video signal comprises an analog video signal and said integrating processor further comprises:
   an A/D converter for converting the analog video signal into a series of digital pixel values;
   an arithmetic processing unit for fractionalizing each pixel value and summing with a stored fractionalized value of at least one geometrically corresponding pixel and outputting summed pixel values;
   a memory, coupled to the arithmetic processing unit, for storing summed pixel values for combining with successive frames; and
   a D/A converter, coupled to the arithmetic processing unit, for converting the summed pixel values into an analog output video signal.

3. The apparatus of claim 1, wherein said input video signal comprises a digital video signal comprising a series of digital pixel values, said integrating processor comprises:
   an arithmetic processing unit for fractionalizing each pixel value and summing with a stored fractionalized value of at least one geometrically corresponding pixel and outputting a filtered video signal; and
   a memory for storing fractionalized pixel values as new pixel values.

4. An apparatus for automatically controlling temporal integration in a real time video image processor, comprising:
   an integrating processor for receiving an input video signal, recursively filtering the input video signal, and outputting a filtered video signal; and
   an integration controller, coupled to said integrating processor and receiving the input video signal, for detecting brightness and motion in the input video signal and for controlling an amount of recursive filtration performed by said integrating processor based upon an amount of brightness and motion detected in the input video signal, said integration controller comprising:
   a timing generator for receiving the input video signal and extracting synchronization information from the input video signal and outputting timing signals;
   a brightness detector for receiving the input video signal, detecting a relative brightness value from the received input video signal, and outputting a relative brightness value;
   a motion detector for receiving the input video signal and generating a series of pixel values derived from pixels distributed throughout an image frame of the input video signal; and
   a processor unit, coupled to said timing generator, said brightness detector, and said motion detector, for receiving the timing signals, the relative brightness value and the series of pixel values, determining a degree of motion present in the input video signal from the series of pixel values, and outputting a control signal to said integrating processor for controlling the amount of recursive filtration performed by said integrating processor based upon the amount of brightness and motion detected in the input video signal.

5. The apparatus of claim 4, wherein said processor unit further generates a first feedback signal to said brightness detector establishing an area within an image of said input video signal for said brightness detector to detect brightness.

6. The apparatus of claim 5, wherein said processor unit further generates a second feedback signal to said motion detector establishing a pixel location within an image of said input video signal for said motion detector to generate pixel values.

7. An apparatus for automatically controlling temporal integration in a real time video image processor, comprising:
   an integrating processor for receiving an input video signal, recursively filtering the input video signal, and outputting a filtered video signal; and
   an integration controller, coupled to said integrating processor and receiving the input video signal, for detecting brightness and motion in the input video signal and for controlling an amount of recursive filtration performed by said integrating processor based upon an amount of brightness and motion detected in the input video signal, said integration controller comprising:
      a sync separator for receiving the input video signal and stripping video information from the input video signal to produce a series of horizontal and vertical timing pulses;
      a first timing unit, coupled to said sync separator, for receiving the horizontal and vertical timing pulses and generating a switching signal in response to the horizontal and vertical timing pulses;
      a video switch, coupled to the first timing unit and receiving the input video signal, for receiving the switching signal and selectively switching the input video signal to output a selected portion of the input video signal;
      a brightness integrator, coupled to said video switch for receiving the selected portion of the input video signal and outputting a brightness signal relative to brightness of the selected portion of the input video signal; and
      a processor, coupled to the video switch, the first timing unit, and the brightness integrator, for receiving the brightness signal and generating an output control signal for controlling recursive filtering in said integrating processor in response to the received brightness signal.

8. The apparatus of claim 7, wherein said integration controller further comprises a DC restorer and buffer amplifier, coupled to the video switch, for receiving the input video signal, clamping the input video signal to a predetermined constant level, and outputting a clamped input video signal to the video switch.

9. The apparatus of claim 8, wherein said processor further outputs to said first timing unit an area select signal for controlling said video switch to selectively switch the input video signal to output the selected portion of the input video signal proportional to the area select signal.

10. The apparatus of claim 7, further comprising:
   a second timing unit, coupled to said sync separator for generating a second switching signal as an output; and
   an A/D converter, coupled to said second timing unit, said video switch, and said processor, for converting the selected portion of the input video signal into a plurality of digital pixel values as selected by the second switching signal from the second timing unit and outputting the selected pixel values to said processor,
   wherein said processor further generates a motion signal indicative of a degree of motion within the selected portion of the input video signal and by comparing each of the plurality of pixel values with a corresponding previous value from a preceding corresponding video frame and said processor further generates an output control signal for controlling recursive filtering in said integrating processor in response to both the received brightness signal and the motion signal.

11. The apparatus of claim 10, wherein said processor is coupled to said second timing unit and said processor outputs to said second timing unit a pixel select signal indicative of a selected area in which motion is to be detected.

12. The apparatus of claim 11, wherein said processor comprises a fuzzy logic system for generating descriptor values corresponding to specific numerical values or ranges of a brightness value and a motion value and applies the descriptor values using a rule-based system for interpolation to generate an M factor for controlling the amount of recursive filtration performed by said integrating processor.

13. The apparatus of claim 12 wherein the fuzzy logic system further generates from the brightness value and the motion value, set membership values comprising fractional values between zero, representing not a member of the set in question, and one, representing a full member of the set in question.

14. The apparatus of claim 13, wherein the brightness value is assigned a descriptor value from an integer value ranging from 0 to 255 characterizing as low, medium, or high brightness levels.

15. The apparatus of claim 14, wherein the motion value is assigned a descriptor value from an integer value ranging from 0 to 15 characterizing low, medium, or high levels of motion.

16. The apparatus of claim 15, wherein the M factor is assigned a descriptor value from an integer value ranging from 0 to 63 characterizing low, medium-low, medium, medium-high, or high M factor values.

17. The apparatus of claim 16, wherein a range of M factor output values are produced from the brightness value and the motion value based upon degree of membership of the M factor output values in a set of output descriptors.

18. The apparatus of claim 17, wherein a discrete output M factor value is derived using a center of maximum evaluation.

19. The apparatus of claim 18, wherein a range of outputs for the M factor value is used to derive a specific output M factor value using a center-of-maximum method to evaluate a range of output values and produce a single discrete output as follows:

$$M \text{ factor} = \frac{\Sigma_i [\mu_{f_i} \cdot \max_x(\mu_{R_i}) \cdot arg(\max_x(\mu_{R_i}))]}{\Sigma_i \mu_{f_i}}$$

where R represents a verbal descriptor to be converted to a discrete output value, $\mu_{R_i}$ represents membership functions of all verbal descriptors i defined for a base variable range, and $\mu_{f_i}$ represents an inference result for every term i.

20. A method for automatically controlling temporal integration in a real time video image processor, comprising the steps of:
   receiving, in an integrating processor, an input video signal,
   recursive filtering the input video signal in the integrating processor,
   receiving, in an integration controller coupled to the integrating processor, an input video signal,
   detecting, in the integration controller, brightness and motion in the input video signal,
   controlling, in the integration controller, an amount of recursive filtration performed in said step of recursive filtering, based upon an amount of brightness and motion detected in the input video signal, and outputting a filtered video signal, wherein said steps of detecting and controlling comprise the steps of:

receiving, in a brightness detector the input video signal, detecting, in the brightness detector, a relative brightness value from the received input video signal, and outputting the relative brightness value, receiving, in a motion detector, the input video signal, generating, in the motion detector, a motion value based upon a comparison of a frame of the input video signal with a preceding frame of the input video signal, receiving, in a processor unit coupled to the brightness detector, and the motion detector, the relative brightness value and the motion value, and outputting, from the processing unit, a control signal to the integrating processor for controlling the amount of recursive filtration performed by the integrating processor based upon the amount of brightness and motion detected in the input video signal.

21. The method of claim 20, wherein said input video signal comprises an analog video signal and said step of recursive filtering further comprises the steps of:

converting, in an A/D converter, the analog video signal into a series of digital pixel values, fractionalizing, in an arithmetic processing unit, each pixel value to produce a fractionalized pixel value, summing, in the arithmetic processing unit, each fractionalized pixel value with a stored fractionalized value of at least one geometrically corresponding pixel to produce summed pixel values, outputting, from the arithmetic processing unit, the summed pixel values, storing, in a memory coupled to the arithmetic processing unit, the summed pixel values for combining with successive frames, and converting, in a D/A converter coupled to the arithmetic processing unit, the summed pixel values into an analog output video signal.

22. The method of claim 20, wherein said input video signal comprises a digital video signal comprising a series of digital pixel values, said step of recursive filtering further comprises the steps of:

fractionalizing, in an arithmetic processing unit, each pixel value to produce a series of fractionalized pixel values, summing, in the arithmetic processing unit, each of the series of fractionalized pixel values with corresponding stored fractionalized values of at least one geometrically corresponding pixel to produce a series of summed fractionalized pixel values, outputting, from the arithmetic logic unit, the summed fractionalized pixel values as the filtered video signal, and storing, in a memory, the series of fractionalized pixel values as new pixel values.

23. A method for automatically controlling temporal integration in a real time video image processor, comprising the steps of:

receiving, in an integrating processor, an input video signal, recursive filtering the input video signal in the integrating processor, receiving, in an integration controller coupled to the integrating processor, an input video signal, detecting, in the integration controller, brightness and motion in the input video signal, controlling, in the integration controller, an amount of recursive filtration performed in said step of recursive filtering, based upon an amount of brightness and motion detected in the input video signal, and outputting a filtered video signal;

wherein said steps of controlling and detecting comprise the steps of:

receiving, in a timing generator, the input video signal, extracting, in the timing generator, synchronization information from the input video signal, generating, in the timing generator, timing signals from the synchronization information, outputting, from the timing generator, the timing signals, receiving, in a brightness detector the input video signal, detecting, in the brightness detector, a relative brightness value from the received input video signal, and outputting the relative brightness value, receiving, in a motion detector, the input video signal, generating, in the motion detector, a series of pixel values derived from pixels distributed throughout an image frame of the input video signal, receiving, in a processor unit coupled to the timing generator, the brightness detector, and the motion detector, the timing signals, the relative brightness value and the series of pixel values, determining, in the processor unit, a degree of motion present in the input video signal from the series of pixel values, and outputting, from the processing unit, a control signal to the integrating processor for controlling the amount of recursive filtration performed by the integrating processor based upon the amount of brightness and motion detected in the input video signal.

24. The method of claim 23, wherein said step of determining further comprises the step of generating, in the processor unit, a first feedback signal to the brightness detector establishing an area within an image of the input video signal for the brightness detector to detect brightness.

25. The method of claim 24, wherein said step of determining further comprises the step of generating, in the processor unit, a second feedback signal to the motion detector establishing a pixel location within an image of the input video signal for the motion detector to generate pixel values.

26. A method for automatically controlling temporal integration in a real time video image processor, comprising the steps of:

receiving, in an integrating processor, an input video signal.

recursive filtering the input video signal in the integrating processor, receiving, in an integration controller coupled to the integrating processor, an input video signal, detecting, in the integration controller, brightness and motion in the input video signal, controlling, in the integration controller, an amount of recursive filtration performed in said step of recursive filtering, based upon an amount of brightness and motion detected in the input video signal, and outputting a filtered video signal;

wherein said steps of controlling and detecting further comprise:
- receiving, in a sync separator, the input video signal,
- stripping, in the sync separator, video information from the input video signal to produce a series of horizontal and vertical timing pulses,
- receiving, in a first timing unit coupled to the sync separator, the horizontal and vertical timing pulses and generating a switching signal in response to the horizontal and vertical timing pulses,
- receiving, in a video switch coupled to the first timing unit, the input video signal and the switching signal,
- selectively switching, in the video switch, the input video signal to output a selected portion of the input video signal in response to the switching signal,
- receiving, in a brightness integrator coupled to the video switch, the selected portion of the input video signal,
- generating, in the brightness integrator, a brightness signal relative to brightness of the selected portion of the input video signal,
- receiving, in a processor coupled to the video switch, the first timing unit, and the brightness integrator, the brightness signal, and
- generating, in the processor, an output control signal for controlling recursive filtering in the integrating processor in response to the received brightness signal.

27. The method of claim 26, wherein said steps of controlling and detecting further comprise the steps of:
- receiving, in a DC restorer and buffer amplifier coupled to the video switch, the input video signal,
- clamping, in the DC restorer and buffer amplifier, the input video signal to a predetermined constant level, and
- outputting, from the DC restorer and buffer amplifier, a clamped input video signal to the video switch.

28. The method of claim 27, wherein the processor further outputs to the first timing unit an area select signal for controlling the video switch to selectively switch the input video signal to output the selected portion of the input video signal proportional to the area select signal.

29. The method of claim 28, wherein said steps of controlling and detecting further comprise the steps of:
- generating, in a second timing unit coupled to the sync separator, a second switching signal as an output,
- converting, in an A/D converter coupled to the second timing unit, the video switch, and the processor, the selected portion of the input video signal into a plurality of digital pixel values as selected by the second switching signal from the second timing unit,
- outputting, from the A/D converter, the selected pixel values to the processor,
- wherein the processor further generates a motion signal indicative of a degree of motion within the selected portion of the input video signal and by comparing each of the plurality of pixel values with a corresponding previous value from a preceding corresponding video frame and the processor further generates the output control signal for controlling recursive filtering in the integrating processor in response to both the received brightness signal and the motion signal.

30. The method of claim 29, wherein the processor is coupled to the second timing unit and the processor outputs to the second timing unit a pixel select signal indicative of a selected area in which motion is to be detected.

31. The method of claim 30, wherein the processor comprises a fuzzy logic system for generating descriptor values corresponding to specific numerical values or ranges of a brightness value and a motion value and applies the descriptor values using a rule-based system for interpolation to generate an M factor for controlling the amount of recursive filtration performed by the integrating processor.

32. The method of claim 31 wherein the fuzzy logic system further generates from the brightness value and the motion value, set membership values comprising fractional values between zero, representing not a member of the set in question, and one, representing a full member of the set in question.

33. The method of claim 32, wherein the brightness value is assigned a descriptor value from an integer value ranging from 0 to 255 characterizing as low, medium, or high brightness levels.

34. The method of claim 33, wherein the motion value is assigned a descriptor value from an integer value ranging from 0 to 15 characterizing low, medium, or high levels of motion.

35. The method of claim 34, wherein the M factor is assigned a descriptor value from an integer value ranging from 0 to 63 characterizing low, medium-low, medium, medium-high, or high M factor values.

36. The method of claim 35, wherein a range of M factor output values are produced from the brightness value and the motion value based upon degree of membership of the M factor output values in a set of output descriptors.

37. The method of claim 36, wherein a discrete output M factor value is derived using a center of maximum evaluation.

38. The method of claim 37, wherein a range of outputs for the M factor value is used to derive a specific output M factor value using a center-of-maximum method to evaluate a range of output values and produce a single discrete output as follows:

$$M \text{ factor} = \frac{\Sigma_i [\mu_{fi} \cdot \max_x(\mu_{Ri}) \cdot arg(\max_x(\mu_{Ri}))]}{\Sigma_j \mu_{fi}}$$

where R represents a verbal descriptor to be converted to a discrete output value, $\mu_{Ri}$ represents membership functions of all verbal descriptors i defined for a base variable range, and $\mu_{fi}$ represents an inference result for every term i.

39. An apparatus for automatically controlling temporal integration in a real time video image processor, comprising:
- an integrating processor for receiving an input video signal, recursively filtering the input video signal, and outputting a filtered video signal; and
- an integration controller, coupled to said integrating processor and receiving the input video signal, for detecting brightness in the input video signal and for controlling an amount of recursive filtration performed by said integrating processor based upon an amount of brightness detected in the input video signal, said integration controller including:
  - a brightness detector for receiving the input video signal, detecting a relative brightness value from the received input video signal, and outputting a relative brightness value; and
  - processing means, coupled to the brightness detector, for receiving the relative brightness value and outputting a control signal to said integrating processor for controlling the amount of recursive filtration performed by said integrating processor based upon the amount of brightness detected in the input video signal.

* * * * *